United States Patent
Berger et al.

(10) Patent No.: US 8,021,769 B2
(45) Date of Patent: Sep. 20, 2011

(54) PATTERNED PERPENDICULAR MAGNETIC RECORDING MEDIUM WITH EXCHANGE COUPLED RECORDING LAYER STRUCTURE AND MAGNETIC RECORDING SYSTEM USING THE MEDIUM

(75) Inventors: Andreas Klaus Berger, San Jose, CA (US); Eric E. Fullerton, San Diego, CA (US); Olav Hellwig, San Jose, CA (US); Byron Hassberg Lengsfield, III, Gilroy, CA (US); Ernesto E. Marinero, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 366 days.

(21) Appl. No.: 11/751,823

(22) Filed: May 22, 2007

(65) Prior Publication Data
US 2008/0292907 A1   Nov. 27, 2008

(51) Int. Cl.
*G11B 5/66* (2006.01)
(52) U.S. Cl. ...... 428/827; 428/826; 428/829; 428/848.5
(58) Field of Classification Search ........ 428/800–848.9
See application file for complete search history.

(56) References Cited

U.S. PATENT DOCUMENTS

| | | | |
|---|---|---|---|
| 6,347,016 B1 * | 2/2002 | Ishida et al. | 360/17 |
| 6,440,520 B1 * | 8/2002 | Baglin et al. | 428/847.7 |
| 6,602,612 B2 * | 8/2003 | Abarra et al. | 428/611 |
| 6,754,017 B2 | 6/2004 | Rettner | |
| 6,881,497 B2 | 4/2005 | Coffey et al. | |
| 6,947,235 B2 | 9/2005 | Albrecht et al. | |
| 6,982,845 B2 | 1/2006 | Kai et al. | |
| 7,498,092 B2 | 3/2009 | Berger et al. | |
| 2003/0162041 A1 * | 8/2003 | Nemoto et al. | 428/469 |
| 2004/0038082 A1 * | 2/2004 | Tsumori | 428/694 SG |
| 2004/0091748 A1 * | 5/2004 | Kamata et al. | 428/694 T |
| 2004/0166372 A1 | 8/2004 | Haginoya et al. | |

(Continued)

FOREIGN PATENT DOCUMENTS

| | | |
|---|---|---|
| CN | 1802697 A | 4/2004 |
| JP | 2003317220 | 11/2003 |

OTHER PUBLICATIONS

Moritz et al., "Patterned Media Made From Pre-Etched Wafers: A Promising Route Toward Ultrahigh-Density Magnetic Recording", IEEE Transactions on Magnetics, vol. 38, No. 4, Jul. 2002, pp. 1731-1736.

(Continued)

*Primary Examiner* — Holly Rickman
*Assistant Examiner* — Linda Chau
(74) *Attorney, Agent, or Firm* — Thomas R. Berthold (57) ABSTRACT

A patterned perpendicular magnetic recording medium has discrete magnetic islands, each of which has a recording layer (RL) structure that comprises two exchange-coupled ferromagnetic layers. The RL structure may be an "exchange-spring" RL structure with an upper ferromagnetic layer (MAG2), sometimes called the exchange-spring layer (ESL), ferromagnetically coupled to a lower ferromagnetic layer (MAG1), sometimes called the media layer (ML). The RL structure may also include a coupling layer (CL) between MAG1 and MAG2 that permits ferromagnetic coupling. The interlayer exchange coupling between MAG1 and MAG2 may be optimized, in part, by adjusting the materials and thickness of the CL. The RL structure may also include a ferromagnetic lateral coupling layer (LCL) that is in contact with at least one of MAG1 and MAG2 for mediating inter-granular exchange coupling in the ferromagnetic layer or layers with which it is in contact (MAG2 or MAG1). The ferromagnetic alloy in the LCL has significantly greater inter-granular exchange coupling than the ferromagnetic alloy with which it is in contact (MAG2 or MAG1).

9 Claims, 10 Drawing Sheets

U.S. PATENT DOCUMENTS

| | | | |
|---|---|---|---|
| 2004/0185306 A1* | 9/2004 | Coffey et al. | 428/694 TM |
| 2005/0164035 A1 | 7/2005 | Lee et al. | |
| 2006/0177704 A1 | 8/2006 | Berger et al. | |
| 2006/0204791 A1* | 9/2006 | Sakawaki et al. | 428/828.1 |
| 2006/0222896 A1 | 10/2006 | Inomata | |
| 2006/0269792 A1* | 11/2006 | Fullerton et al. | 428/828 |

OTHER PUBLICATIONS

Thomson et al., "Intrinsic Distribution of Magnetic Anisotropy in Thin Films Probed by Patterned Nanostructures", Phys. Rev. Lett. 96, 257204 (2006).

Hu, et al., "Magnetic and recording properties of Co/Pd islands on prepatterned substrates", J. Appl. Phys., vol. 95, No. 11, Part 2, Jun. 1, 2004, pp. 7013-7015.

Victora et al., "Composite Media for Perpendicular Magnetic Recording", IEEE Trans MAG 41 (2), 537-542, Feb. 2005; and J. P. Wang et al., "Composite media (dynamic tilted media) for magnetic recording", Appl. Phys. Lett. 86 (14) Art. No. 142504, Apr. 4, 2005.

Richter et al, "Recording potential of bit-patterned media", Appl. Phys. Lett. 88, 222512 (2006), published online Jun. 2, 2006.

* cited by examiner

PATTERNED PERPENDICULAR MAGNETIC RECORDING MEDIUM WITH EXCHANGE COUPLED RECORDING LAYER STRUCTURE AND MAGNETIC RECORDING SYSTEM USING THE MEDIUM

BACKGROUND OF THE INVENTION

1. Field of the Invention

This invention relates generally to patterned perpendicular magnetic recording media, such as disks for use in magnetic recording hard disk drives, and more particularly to patterned disks with data islands having improved magnetic recording properties.

2. Description of the Related Art

Magnetic recording hard disk drives with patterned magnetic recording media have been proposed to increase data density. In conventional continuous magnetic recording media, the magnetic recording layer is a continuous layer over the entire surface of the disk. In patterned media the magnetic recording layer on the disk is patterned into small isolated data islands arranged in concentric data tracks. Patterned-media disks may be longitudinal magnetic recording disks, wherein the magnetization directions are parallel to or in the plane of the recording layer, or perpendicular magnetic recording disks, wherein the magnetization directions are perpendicular to or out-of-the-plane of the recording layer. Perpendicular media will likely be the choice for patterned media because of the increased data density potential of perpendicular media. To produce magnetic isolation of the patterned data islands, the magnetic moment of the spaces between the islands are destroyed or substantially reduced to render these spaces essentially nonmagnetic. Alternatively, the media may be fabricated so that that there is no magnetic material in the spaces between the islands. U.S. Pat. No. 5,820,769 describes a type of patterned perpendicular media and its fabrication method.

In one type of patterned media, the data islands are elevated, spaced-apart pillars that extend above the disk substrate surface to define troughs or trenches on the substrate surface between the pillars. This type of patterned media is of interest because substrates with the pre-etched pattern of pillars and trenches can be produced with relatively low-cost, high volume processes such as lithography and nanoimprinting. The magnetic recording layer material is then deposited over the entire surface of the pre-etched substrate to cover both the ends of the pillars and the trenches. The trenches may be recessed far enough from the read/write head so as to not adversely affect reading or writing, or the magnetic material in the trenches may be rendered essentially nonmagnetic during fabrication. This type of patterned media is described by Moritz et al., "Patterned Media Made From Pre-Etched Wafers: A Promising Route Toward Ultrahigh-Density Magnetic Recording", *IEEE Transactions on Magnetics*, Vol. 38, No. 4, July 2002, pp. 1731-1736.

One problem associated with patterned perpendicular media is the relatively wide variation in the coercive field among the individual magnetic islands, sometimes also called "dots". This variation is characterized by a wide distribution of the switching field, i.e., the write field required to switch the magnetization of a magnetic island from one state to the other state. Ideally the switching field distribution (SFD) width would be zero, meaning that all the bits would switch at the same write field strength. Additionally, it has been found that the SFD broadens (that is, the bit-to-bit variation in the coercive field increases) as the size of the magnetic islands is reduced, which limits the achievable density of patterned perpendicular media. The SFD in arrays of dots with perpendicular magnetic anisotropy has been explained by a distribution of intrinsic anisotropy by Thomson et al., "Intrinsic Distribution of Magnetic Anisotropy in Thin Films Probed by Patterned Nanostructures", *Phys. Rev. Lett.* 96, 257204 (2006).

An additional problem arises in patterned perpendicular media because of a key difference with conventional continuous perpendicular media, namely the fact that in conventional continuous media the linear density (along-the-track density of the bits) is typically 4 to 6 times the track density (the density of the tracks in the radial or cross-track direction), while in patterned media the linear density and track density will be about the same. This is because any suitable patterned media fabrication process will only be utilized to its full potential if along-the-track and cross-track dot spacings are similar in size. Thus, much higher track densities are anticipated for patterned media which will result in greater adjacent track interference during reading and overwriting of adjacent tracks during writing. The write head has to be wide enough in the cross-track direction to ensure that the magnetic field is sufficiently strong over the entire width of the dot. This may result in fringing fields from the write head leaking into dots in adjacent tracks which can cause inadvertent overwriting. This problem is exacerbated because the fringing fields acting on dots in adjacent tracks encompass relatively large angles with the perpendicular easy-axis of the recording layer on the dots, which increases the likelihood of adjacent track overwrite.

What is needed is a patterned perpendicular magnetic recording medium that has a narrow SFD and is less susceptible to adjacent track overwrite.

SUMMARY OF THE INVENTION

The invention is a patterned perpendicular magnetic recording medium in which the discrete magnetic islands have a recording layer (RL) structure that comprises two exchange-coupled ferromagnetic layers (MAG1 and MAG2). The RL structure may be a high-anisotropy small-grained layer (MAG1), like an oxide-containing granular ferromagnetic Co alloy, that is in contact with and exchange-coupled to MAG2, a high-moment ferromagnetic lateral coupling layer (LCL) like a Co alloy with no oxides. Because the LCL grain boundaries overlay the boundaries of the generally segregated and decoupled grains of MAG1 with which it is in contact, and the LCL and MAG1 grains are strongly coupled perpendicularly, the LCL introduces an effective intergranular exchange coupling in MAG1.

The RL structure may be an "exchange-spring" RL structure with an upper ferromagnetic layer (MAG2), sometimes called the exchange-spring layer (ESL), ferromagnetically coupled to a lower ferromagnetic layer (MAG1), sometimes called the media layer (ML). MAG2 and MAG1 may have substantially the same anisotropy field $H_k$, but preferably MAG2 has a substantially lower $H_k$ than MAG1.

The RL structure may also include a coupling layer (CL) between MAG1 and MAG2 that permits ferromagnetic coupling. If a CL is used, MAG2 and MAG1 may have similar or substantially different values of $H_k$. Because the CL must enable an appropriate interlayer exchange coupling strength between MAG1 and MAG2, it should be either nonmagnetic or weakly ferromagnetic. The interlayer exchange coupling between MAG1 and MAG2 may be optimized, in part, by adjusting the materials and thickness of the CL.

The RL structure may also include a lateral coupling layer (LCL) that is in contact with at least one of MAG1 and MAG2 for mediating intergranular exchange coupling in the ferromagnetic layer or layers with which it is in contact. The LCL may be formed of Co, or ferromagnetic Co alloys, such as CoCr alloys, that may also include one or both of Pt and B. The ferromagnetic alloy in the LCL has significantly greater intergranular exchange coupling than the ferromagnetic alloy with which it is in contact (MAG2 or MAG1). The LCL alloy should preferably not include any oxides or other segregants, which would tend to reduce intergranular exchange coupling in the LCL. Because the LCL grain boundaries overlay the boundaries of the generally segregated and decoupled grains of the MAG2 (or MAG1) layer with which it is in contact, and the LCL and MAG2 (or MAG1) grains are strongly coupled perpendicularly, the LCL introduces an effective intergranular exchange coupling in the MAG2 (or MAG1).

When the magnetic islands have the above-described RL structure, the result is a patterned perpendicular magnetic recording medium with a narrower SFD, which allows for a more robust on-track write process. When MAG2 and MAG1 form an "exchange-spring" RL structure, the result is a more favorable field angle dependence, i.e., the magnetization in adjacent islands is less susceptible to being switched by fringing fields that make an angle with the perpendicular easy-axis of the adjacent islands.

The invention is also a magnetic recording disk drive that incorporates the above-described patterned perpendicular magnetic recording disk.

For a fuller understanding of the nature and advantages of the present invention, reference should be made to the following detailed description taken together with the accompanying figures.

DETAILED DESCRIPTION OF THE INVENTION

Figure 1:
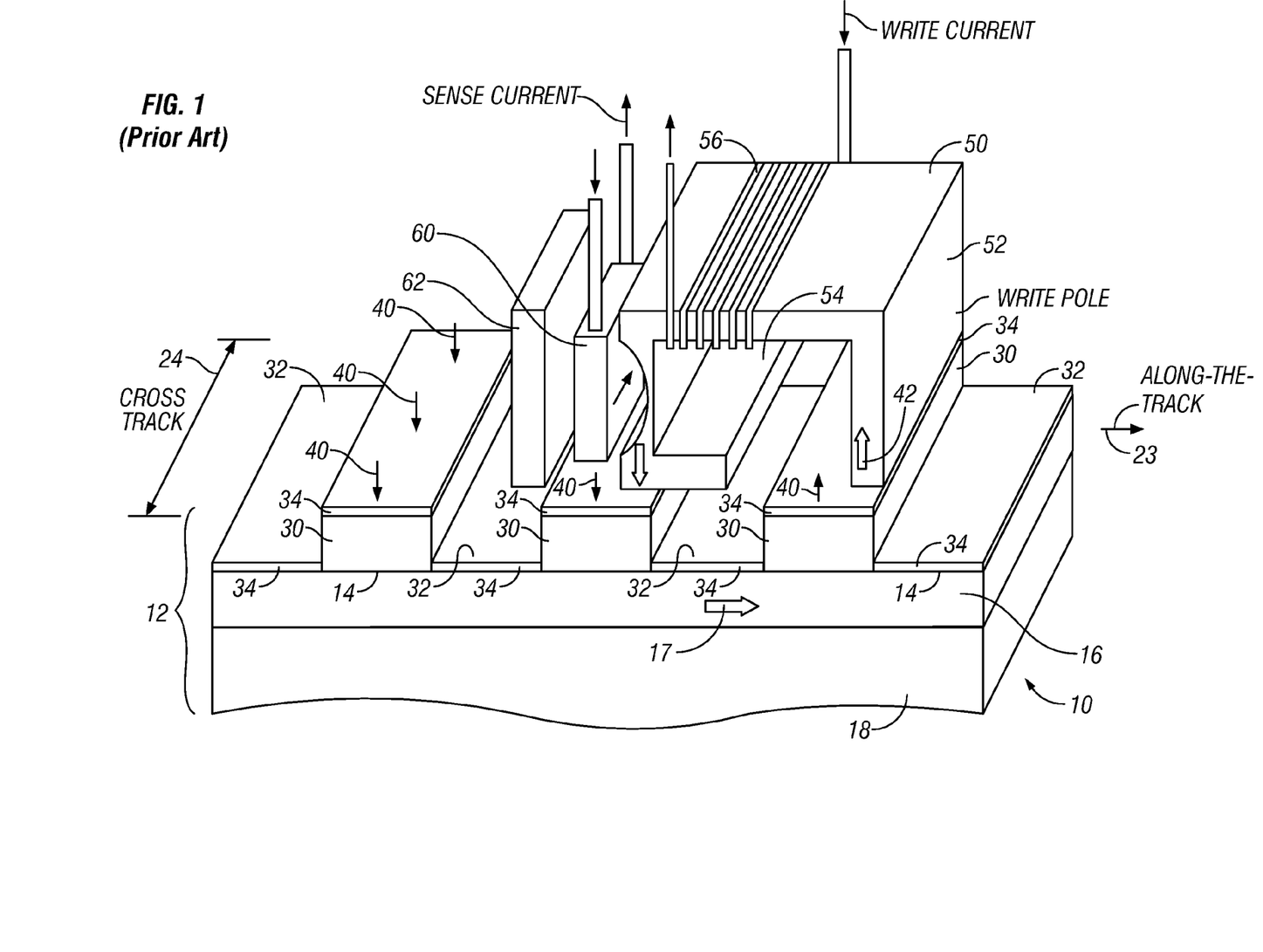
FIG. 1 is a schematic representation of a perpendicular magnetic recording system with a prior art patterned perpendicular medium.

FIG. 1 is a schematic representation of a prior art perpendicular magnetic recording system with patterned perpendicular media. The system can be implemented in a magnetic recording disk drive, with the medium being a magnetic recording disk with the patterned bits arranged into concentric circular data tracks. FIG. 1 thus shows a portion of a disk 10 that includes a substrate 12 with a generally planar surface 14. A plurality of discrete patterned islands or pillars 30 extend generally perpendicularly from the surface 14 and are part of substrate 12. The pillars 30 are spaced apart, leaving troughs or trenches 32 recessed below the ends of the pillars 30. A layer 34 of perpendicular magnetic recording material is formed on the ends of the pillars 30 as well as on surface 14 in the trenches 32. The recording layer 34 on each of the pillars 30 is magnetized perpendicularly, as depicted by arrows 40, resulting in the recorded bits being stored in the recording layer 34 in a generally perpendicular or out-of-plane orientation (i.e., other than parallel to the surface of the recording layer 34).

In this type of patterned media, even though there is magnetic recording layer material in the trenches 32, the perpendicular spacing between the trenches 32 and the ends of the pillars 30 is the basis for isolating the recorded bits. Only the perpendicular magnetic recording layer 34 on the ends of the pillars 30 contributes to the readback signal, with each pillar 30 representing one bit. The magnetic recording layer material that is located in the trenches 32 does not significantly contribute to the readback signal and thus does not adversely affect the readback signal. It is also possible that the trenches 32 may contain no magnetic material, or that the magnetic material in the trenches 32 is rendered substantially nonmagnetic so as to not generate any magnetic field. For example, in application Ser. No. 11/558,846 filed Nov. 10, 2006 and assigned to the same assignee as this application, a layer of amorphous silicon (Si) may be located in the trenches and the disk annealed to cause the Si to diffuse into the magnetic trench material and render it nonmagnetic.

As shown in FIG. 1, the substrate 12 may also include an optional "soft" or relatively low-coercivity magnetically permeable underlayer (SUL) 16 formed on a rigid disk support structure or base 18. An exchange break layer (EBL) (not shown) may be located between the magnetically permeable SUL 16 and the recording layer 34 to break the magnetic exchange coupling and to facilitate epitaxial growth of the recording layer. Also shown in FIG. 1 is the read head 60 and the write head 50 (with write pole 52 and a return pole 54). Write current passes through a coil 56 of the write head 50 to generate a magnetic field (arrow 42) at the write pole 52. This magnetic field magnetizes the recording layer 34 on the pillar 30 beneath the write pole in the direction 40. The SUL 16 serves as a flux return path (arrow 17) for the magnetic field between the write pole 52 and the return pole 54 of the write head 50. The detection or reading of the recorded bits is by a read head 60, typically a magnetoresistive (MR) read head, such as a tunneling MR (TMR) read head in which a sense current passes perpendicularly through the layers making up the head. A shield 62 of magnetically permeable material may be used to prevent magnetizations from bits other than the bit being read from reaching the read head 60.

Figure 2:
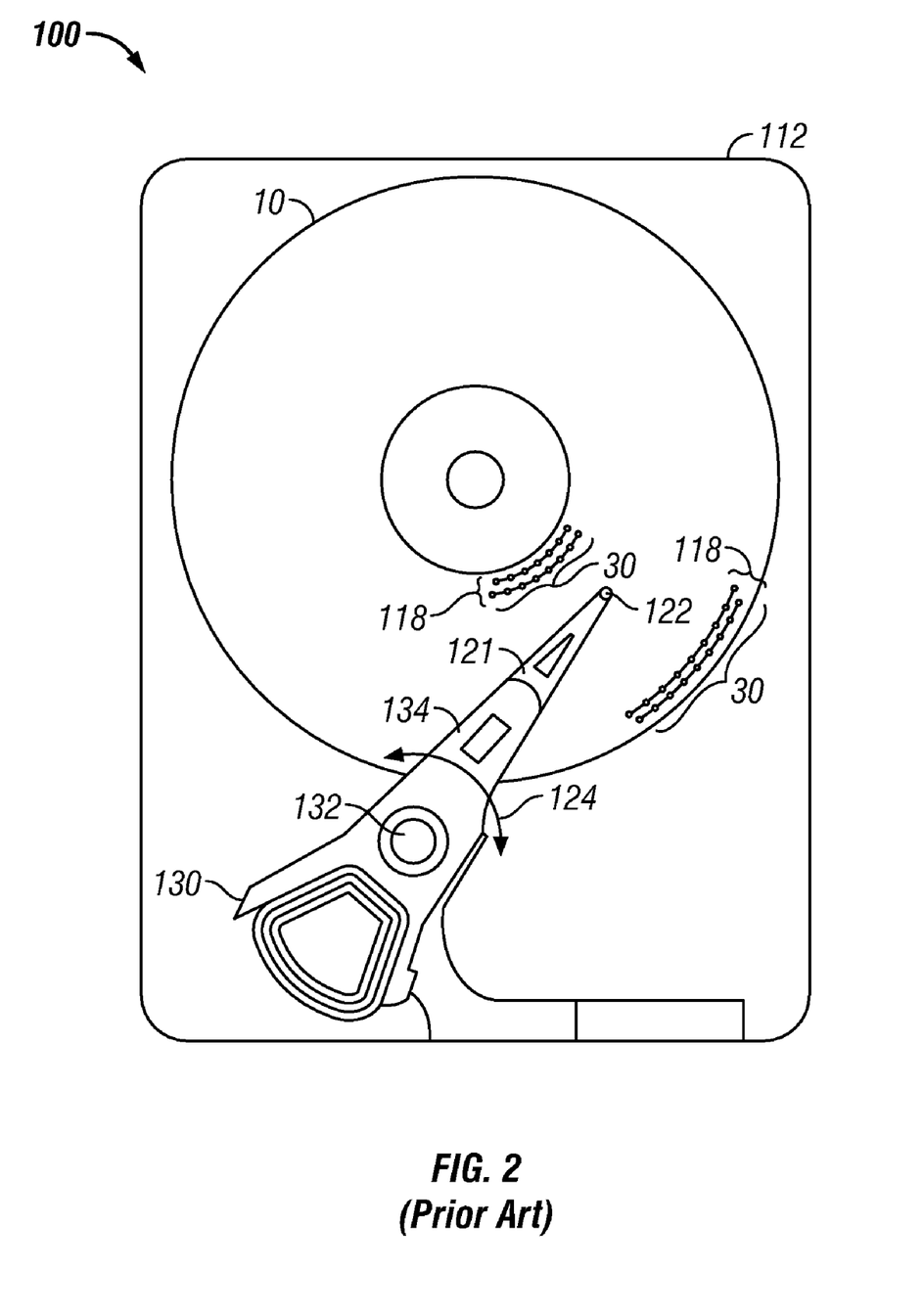
FIG. 2 is a top view of a disk drive implementation of the system illustrated in FIG. 1 and shows the patterned bits arranged in concentric circular data tracks.

FIG. 2 is a top view of a disk drive implementation of the system illustrated in FIG. 1. The drive 100 has a housing or base 112 that supports an actuator 130 and a drive motor for rotating the magnetic recording disk 10. The actuator 130 may be a voice coil motor (VCM) rotary actuator that has a rigid arm 134 and rotates about pivot 132 as shown by arrow 124. A head-suspension assembly includes a suspension 121 that has one end attached to the end of actuator arm 134 and a head carrier 122, such as an air-bearing slider, attached to the other end of suspension 121. The suspension 121 permits the head carrier 122 to be maintained very close to the surface of disk 10. The read head 60 (FIG. 1) and write head 50 (FIG. 1) are typically formed as an integrated read/write head (not shown) patterned on the trailing surface of the head carrier 122. The pillars 30 on disk 10 are arranged in radially-spaced concentric circular data tracks 118. As the disk 10 rotates, the movement of actuator 130 allows the read/write head on the trailing end of head carrier 122 to access different data tracks 118 on disk 10. The writing on patterned media requires the synchronization of the write pulses with the pattern of pillars. A patterned media magnetic recording system that uses the magnetized pillars to clock the writing is described in U.S. Pat. No. 6,754,017 assigned to the same assignee as this application.

Figure 3:
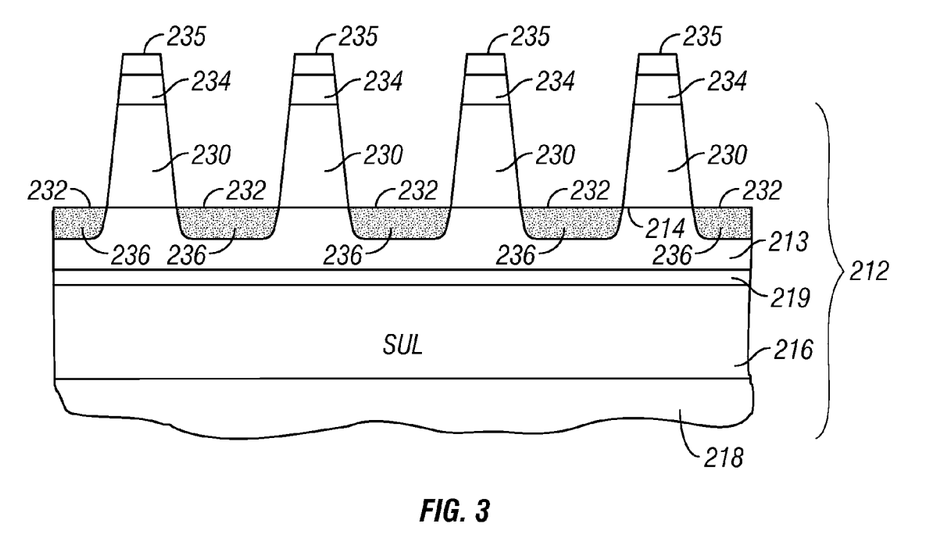
FIG. 3 is a sectional view of one type of patterned perpendicular magnetic recording disk showing the magnetic islands in the form of pillars and nonmagnetic regions in the form of trenches recessed from the tops of the pillars.

FIG. 3 is a sectional view of one type of patterned perpendicular magnetic recording disk showing the magnetic islands in the form of pillars 230 and nonmagnetic regions in the form of trenches 232 recessed from the tops of the pillars 230. The substrate comprises a rigid support structure or base 218, a continuous non-patterned SUL 216 formed on the base 218, a diffusion barrier 219, such as tantalum (Ta), on the SUL 216, and a layer 213 of sputter-deposited amorphous Si on the diffusion barrier 219. The SUL 216 may be a single layer formed of magnetically permeable materials, such as alloys of CoNiFe, FeCoB, CoCuFe, NiFe, FeAlSi, FeTaN, FeN, FeTaC, CoTaZr, CoFeTaZr, CoFeB, and CoZrNb, or a laminated structure formed of multiple soft magnetic films separated by nonmagnetic films, such as electrically conductive films like Al and CoCr or antiferromagnetic coupling films like Ru and Ir. The base 218 may be any commercially available glass disk blank, but may also be a conventional aluminum alloy with a NiP surface coating, or an alternative disk blank, such as silicon, canasite or silicon-carbide. An optional adhesion layer (not shown) for the growth of the SUL, such as an AlTi alloy, may be formed on base 218 before deposition of the SUL 216. Pillars 230, which may be formed of SiN or $SiO_2$ extend from the surface 214 of layer 213. A layer 234 of magnetic recording material having perpendicular magnetic anisotropy is formed on the tops of pillars 230 and a protective overcoat 235, such as a conventional amorphous "diamond-like" carbon, is formed on top of the recording layer 234.

The layer 234 of recording material and the overcoat 235 are deposited over the entire surface of substrate 212 to cover the trenches 232 and the tops of pillars 230. The disk is then annealed, which causes the magnetic recording layer material in the trenches 232 and the Si of layer 213 to diffuse together and chemically react. This creates nonmagnetic regions 236 at the surface 214 in the trenches 232. The material of the recording layer 234 includes at least one element selected from the group consisting of Co, Fe, Pt and Pd, and at least one of these elements reacts with the Si of layer 213. The annealing results in the destruction or at least substantial reduction of any ferromagnetism in the nonmagnetic regions 236, meaning that these regions exhibit no significant magnetic moment after exposure to an applied magnetic field. However, the annealing does not significantly modify the ferromagnetic properties of the recording layer 234 on the ends of pillars 230 because the pillars 230 are formed of non-diffusion material, such as SiN or $SiO_2$, that does not react with the magnetic recording material.

The substrate 212 with pillars 230 may be formed by any well-known technique for forming pre-etched substrates, such as conventional lithography, direct-write electron-beam (e-beam) lithography, and nanoimprinting. For example, a non-diffusion layer of SiN or $SiO_2$ may be deposited or formed over the entire surface 214 of amorphous Si layer 213 to a thickness generally corresponding to the desired height for the pillars 230. The non-diffusion layer is then etched down to surface 214 to form the pillars 230.

In a nanoimprinting process, a master template is fabricated, typically by direct e-beam writing, to have the desired pattern. After a non-diffusion layer, e.g. $SiO_2$, of the material to form pillars 230 is formed on surface 214, a thin film of imprint resist (i.e., a thermal plastic polymer) is spin coated onto the $SiO_2$ layer. Then the master template with its pre-defined pattern is brought into contact with the imprint resist film and the template and substrate are pressed together and heat is applied. When the resist polymer is heated above its glass transition temperature, the pattern on the template is pressed into the resist film. After cooling, the master is separated from the substrate and the patterned resist is left on the $SiO_2$ layer. Reactive-ion-tching (RIE) can be used to transfer the pattern in the resist to the underlying $SiO_2$ layer to form the pillars 230.

In a direct-write e-beam patterning process, after the non-diffusion layer, e.g., $SiO_2$, is formed over the entire surface 214 of substrate 212, a thin resist layer, such as poly-methyl-methacrylate (PMMA), can be deposited on the $SiO_2$ layer. The resist layer is then patterned with an e-beam tool. After this resist layer is developed, a pattern of holes is left in the resist layer. A thin chromium (Cr) layer can then be deposited into the holes and onto the patterned resist layer. In the following lift-off process, the remaining resist together with the Cr on top of it is removed, leaving a pattern of Cr dots. This pattern is transferred onto the $SiO_2$/Si by reactive ion etching (RIE) using the Cr dots as a hard mask. The optional etch-stop layer would facilitate the termination of the RIE. After the desired trench depth (i.e., the height of the pillars) is achieved, the Cr layer is removed and the substrate cleaned. The above-described nanoimprinting and direct-write e-beam patterning processes are well known and described in further detail in numerous references, including G. Hu, et al., "Magnetic and recording properties of Co/Pd islands on prepatterned substrates", *J. Appl. Phys.*, Vol. 95, No. 11, Part 2, 1 Jun. 2004, pp. 7013-7015.

Figure 4:
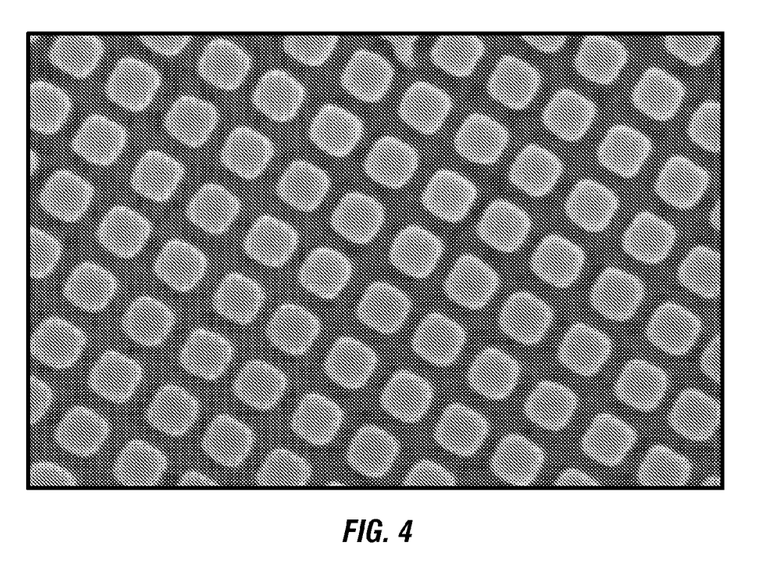
FIG. 4 is a scanning electron microscope (SEM) image showing a top view of an actual structure like that depicted schematically in FIG. 3.

FIG. 4 is a scanning electron microscope (SEM) image showing a top view of an actual structure like that depicted schematically in FIG. 3. The magnetic islands or dots are 40 nm high SiN pillars on a Si wafer with 50 nm island width on a 100 nm pitch (i.e., the spacing between the centers of the pillars is 100 nm). FIG. 3 shows the dots spaced in an arrangement where the ratio of linear density (bits-per-inch in the along-the-track direction) to track density (tracks-pre-inch in the cross-track direction) is about 1:1. However, this is but one illustrative example and is not meant to be a limitation on the dot spacing arrangement on an actual disk.

The prepatterned substrate, including the pillar ends, was covered with a Co/Pd multilayer as the magnetic recording layer. The disk shown in FIG. 3, wherein the discrete magnetic islands are pillars and the nonmagnetic regions separating the magnetic islands are trenches recessed from the tops of the pillars, is but one type of patterned perpendicular media. Other implementations of patterned media are known. For example, the disk of FIG. 3 may have the trenches filled with nonmagnetic material and its upper surface planarized and covered with a continuous layer of protective overcoat covering the pillars and the filled trenches. In another example, a nonmagnetic disk substrate or a nonmagnetic layer on the substrate may have discrete pits or recesses filled with magnetic material that serve as the magnetic islands.

Figure 5:
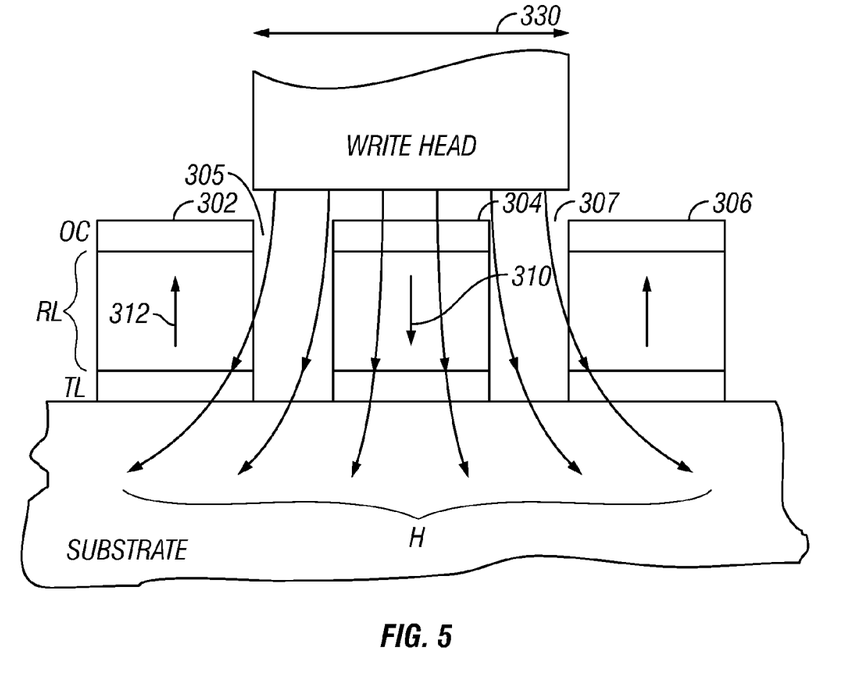
FIG. 5 is a schematic of the write process on patterned perpendicular media.

FIG. 5 is a schematic of the write process on patterned perpendicular media. The media structure includes a substrate with three adjacent discrete magnetic islands 302, 304, 306 located in adjacent tracks, and two nonmagnetic regions 305, 307 separating the magnetic islands. Each magnetic island is shown with a recording layer (RL), an optional template layer (TL) for assisting in the growth of the RL, and a protective overcoat (OC). Each magnetic island is magnetized in one of two perpendicular directions, as shown by arrows 312, 314, 316 in the RLs of islands 302, 304, 306, respectively. The write head is shown above magnetic island 304 and applying a write field H to the RL in island 304. During the write process, the write head applies a sufficiently large magnetic field H to allow for a switching of the magnetization (arrow 310). The write head has to be wide enough (in the cross-track direction 330) to ensure that the magnetic field is sufficiently strong over the width of the island 304. However, this requirement also results in the write field H leaking out into magnetic islands in adjacent tracks, as shown by the field H in the RLs of islands 302, 306. These stray or fringing fields in adjacent islands can cause overwriting (erasure) of adjacent magnetic islands. This problem is exacerbated because the fringing fields onto adjacent tracks encompass large angles with the perpendicular easy-axis of the RLs, as indicated by the angle between write field H and the magnetization of island 302 (arrow 312), which increases the likelihood of adjacent track overwrite.

In the patterned perpendicular media of this invention the RL in the discrete magnetic islands is a structure comprising two exchange-coupled ferromagnetic layers. This results in a narrower SFD to allow for a more robust on-track write process. When the two ferromagnetic layers form an "exchange-spring" RL structure, the result is a more favorable field angle dependence for the magnetization reversal, i.e., the magnetization in adjacent islands is less susceptible to being switched by fields that make an angle with the perpendicular easy-axis.

Exchange-spring perpendicular magnetic recording media are known for conventional continuous magnetic recording. In one technique, the perpendicular recording medium is a composite medium of two ferromagnetically exchange-coupled magnetic layers with substantially different anisotropy fields ($H_k$). (The anisotropy field $H_k$ of a ferromagnetic layer with uniaxial magnetic anisotropy $K_u$ is the magnetic field that would need to be applied along the easy axis to switch the magnetization direction.) Magnetic simulation of this composite medium shows that in the presence of a uniform write field H the magnetization of the lower-$H_k$ layer will rotate first and assist in the reversal of the magnetization of the higher-$H_k$ layer. This behavior is sometimes called the "exchange-spring" behavior. Various types of composite media are described by R. H. Victora et al., "Composite Media for Perpendicular Magnetic Recording", *IEEE Trans MAG* 41 (2), 537-542, Feb. 2005; and J. P. Wang et al., "Composite media (dynamic tilted media) for magnetic recording", *Appl. Phys. Lett.* 86 (14) Art. No. 142504, Apr. 4, 2005. Pending application Ser. No. 11/231,516, filed Sep. 21, 2005 and assigned to the same assignee as this application, describes a perpendicular magnetic recording medium with an exchange-spring RL structure formed of a lower high-$H_k$ magnetic layer, an upper low-$H_k$ magnetic layer, and an intermediate coupling layer (CL) between the two magnetic layers that permits ferromagnetic exchange coupling of the upper and lower magnetic layers.

Pending application Ser. No. 11/372,295, filed Mar. 9, 2006 and assigned to the same assignee as this application, describes a perpendicular recording medium with an exchange-spring RL structure formed of two magnetic layers with substantially similar anisotropy fields $H_k$ that are ferromagnetically exchange-coupled by an intermediate nonmagnetic or weakly ferromagnetic CL. Because the write head produces a larger magnetic field and larger field gradient at the upper portion of the RL, while the field strength decreases further inside the RL, the upper magnetic layer can have a high anisotropy field. The high field and field gradient near the top of the RL, where the upper magnetic layer is located, reverses the magnetization of the upper magnetic layer, which then assists in the magnetization reversal of the lower magnetic layer.

Figure 6:
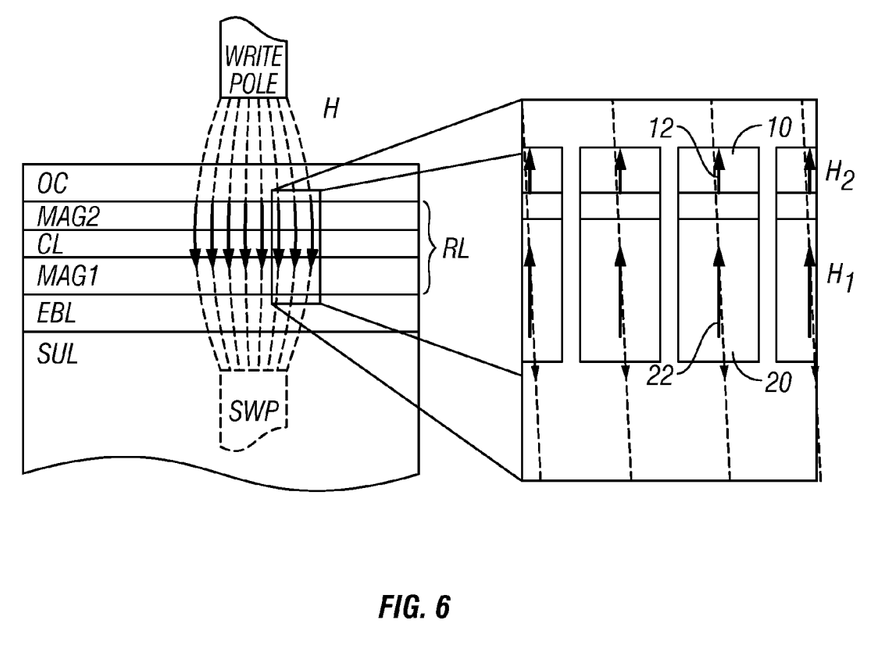
FIG. 6 is a schematic illustrating the manner in which an exchange-spring recording layer (RL) functions when acted upon by a write field.

The manner in which an exchange-spring RL functions is illustrated in FIG. 6, which shows a disk with an exchange-spring RL in sectional view being acted upon by a write field The RL includes a lower magnetic layer (MAG1), which may sometimes be called the media layer (ML), an upper magnetic layer (MAG2), which may sometimes be called the exchange-spring layer (ESL), and a CL that permits ferromagnetic coupling between MAG1 and MAG2. As shown in the expanded portion of FIG. 6, a typical grain 10 in MAG2 has a generally perpendicular or out-of-plane magnetization along an easy axis 12, and is acted upon by a write field H2. A typical grain 20 in MAG1 below the MAG2 grain 10 also has a perpendicular magnetization along an easy axis 22, and is acted upon by a write field H1 less than H2 because MAG1 is farther from the write pole than MAG2. In the presence of the applied write field H2, the MAG2 acts as a write assist layer by exerting a magnetic torque onto MAG1 that assists in reversing the magnetization of MAG1.

In continuous perpendicular magnetic recording media the best signal-to-noise ratio (SNR) is achieved at some intermediate level of intergranular exchange coupling in the RL. Also, intergranular exchange coupling in the RL improves the thermal stability of the magnetization states in the media grains in the RL. Thus in continuous perpendicular recording media, some level of intergranular exchange coupling is advantageous. Thus, pending application Ser. No. 11/532,055 filed Sep. 14, 2006 and assigned to the same assignee as this application, describes a perpendicular magnetic recording medium with an exchange-spring RL structure having a lateral coupling layer (LCL) that is in contact with the upper magnetic layer (MAG2) and mediates intergranular exchange coupling in MAG2.

FIGS. 7A-7E are sectional views of a single discrete magnetic island on a patterned perpendicular magnetic recording medium for different implementations of the medium according to this invention. These implementations are illustrated for the type of patterned medium with pillars, like that shown in FIG. 3, but the invention is applicable to other types of patterned media. A template layer (TL) is shown on top of the pillar to facilitate the growth of the magnetic layers.

Figure 7A:
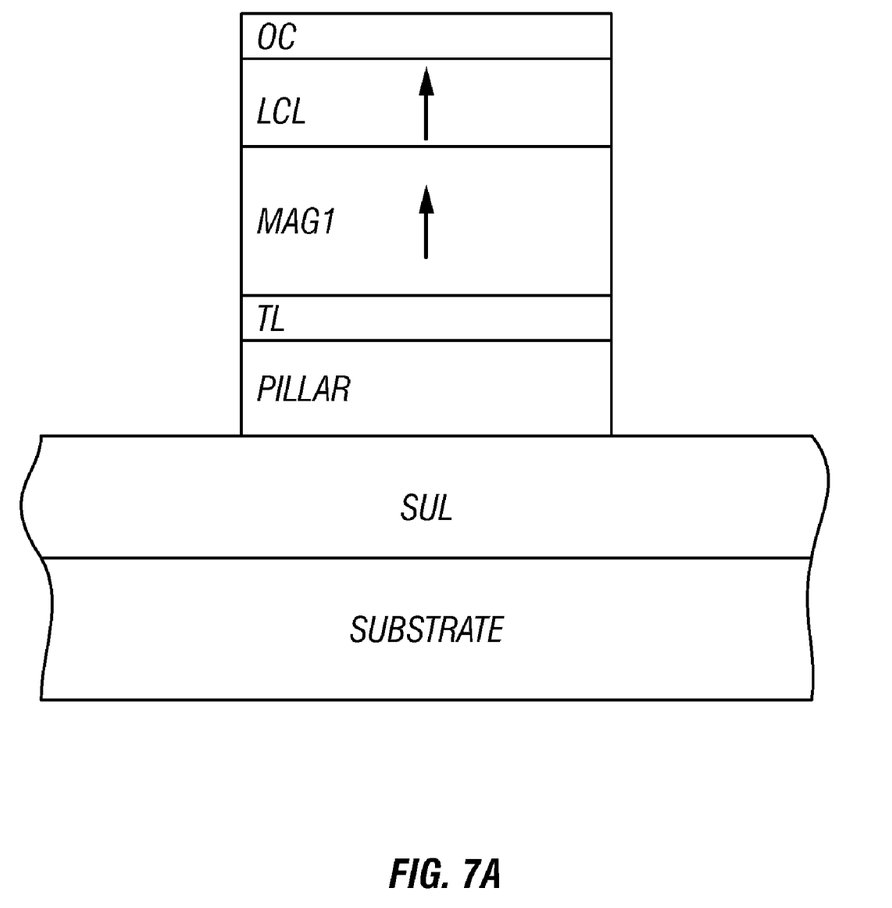
FIGS. 7A-7E are sectional views of a single discrete magnetic island on a patterned perpendicular magnetic recording medium for different implementations of the medium according to this invention.

FIG. 7A is an implementation of the RL with two exchange-coupled ferromagnetic layers wherein MAG1 is a high-$H_k$ small-grained layer and MAG2 is a high-moment lateral coupling layer (LCL). The LCL is deposited directly on MAG1 and exchange couples the grains of the lower MAG1 together such that they switch as a single unit and average their magnetic properties. The LCL thus laterally correlates the reversal of all media grains in a single pattern to reduce the SFD width by means of simple grain averaging. MAG1 may be a granular polycrystalline cobalt alloy, such as a CoPt or CoPtCr alloy, with a suitable segregant such as oxides of one or more of Si, Ta, Ti, Nb, Cr, V and B. The LCL may be formed of Co, or ferromagnetic Co alloys, such as CoCr alloys. The Co alloys may include one or both of Pt and B. The ferromagnetic alloy in the LCL has significantly greater intergranular exchange coupling than the MAG1 ferromagnetic alloy and should preferably not include any oxides or other segregants, which would tend to reduce intergranular exchange coupling in the LCL. Because the LCL grain boundaries overlay the boundaries of the generally segregated and decoupled grains of the MAG1 layer with which it is in contact, and the LCL and MAG1 grains are strongly coupled perpendicularly, the LCL introduces an effective intergranular exchange coupling in MAG1.

Figure 7B:
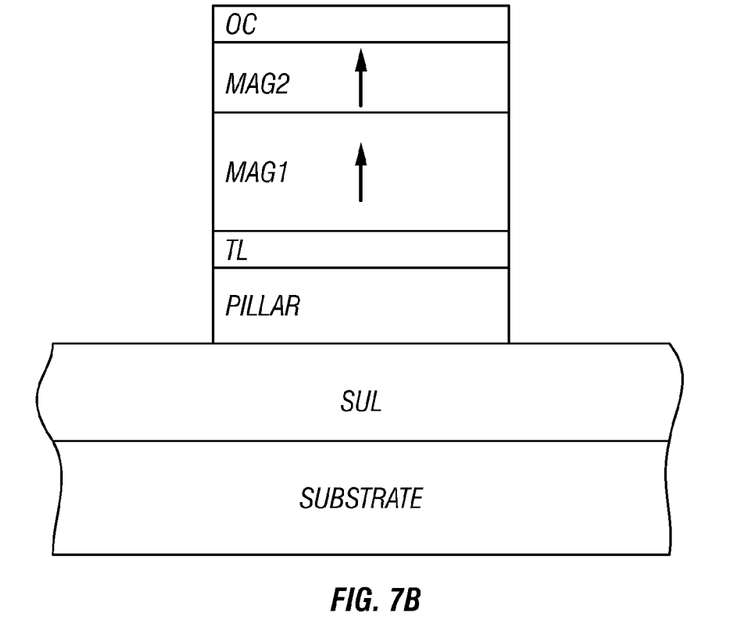

FIG. 7B is an implementation wherein the RL structure is an exchange-spring structure that comprises MAG2 (the ESL) ferromagnetically coupled to MAG1 (the ML) without a CL. In this implementation MAG2 and MAG1 may have substantially the same $H_k$, but preferably MAG2 has a substantially lower $H_k$ than MAG1. In one example of the implementation of FIG. 7C, MAG1 may be a high-$H_k$ small-grained CoPtCr alloy with an added oxide, like Ta-oxide, and MAG2 may be a Co, CoFe, CoNi or CoFeNi based alloy with a $H_k$ lower than the $H_k$ of MAG1 but a magnetic moment higher than the magnetic moment of MAG1. In another example of the implementation of FIG. 7B, MAG1 and MAG2 may each be a laminate or multilayer structure with perpendicular magnetic anisotropy, such as Co/Pt, Co/Pd, Fe/Pt, Fe/Pd and Co/Ni multilayers. Such a structure results in lower SFD because the anisotropy distributions in the two laminates is decorrelated. Since the laminates are exchange-coupled together the resulting distribution of local anisotropy in the composite structure will be a statistical average of the distribution within the layers of each laminate. This can lead to a reduction of the local anisotropy distribution and hence the SFD of the resulting medium. The use of Co/Pd and Co/Ni multilayers as the two laminates (MAG1 and MAG2) results in the two anisotropy distributions being decorrelated. The anisotropy of Co/Pd is dominated by interfacial anisotropy of the Co—Pd, while the Co/Ni anisotropy is dominated by the magnetostriction of the Ni, so it is not surprising that the local variations in the anisotropy within these layers is independent and thus decorrelated.

Figure 7C:
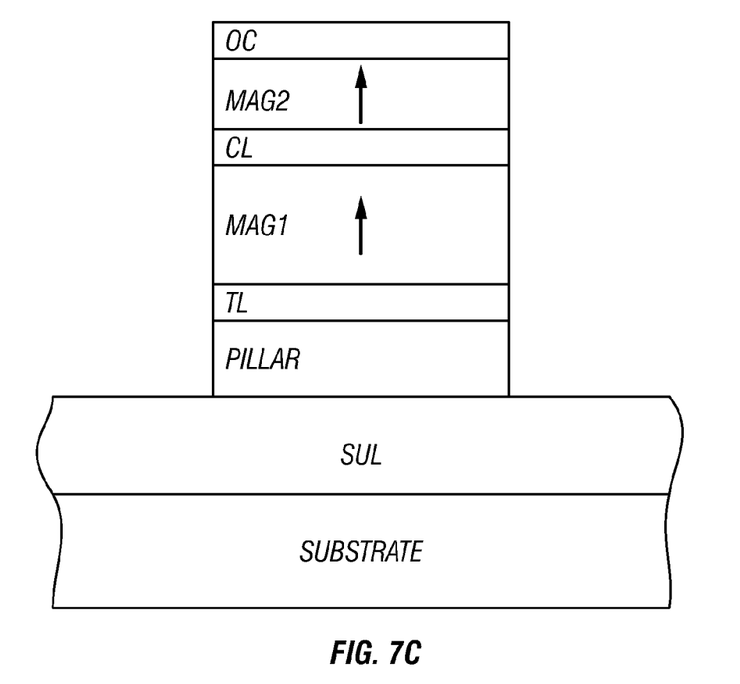
Figure 7D:
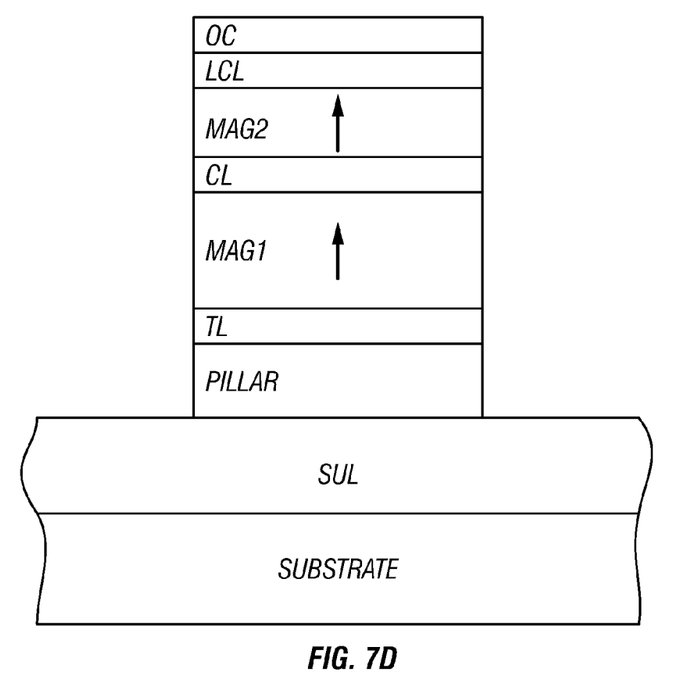
Figure 7E:
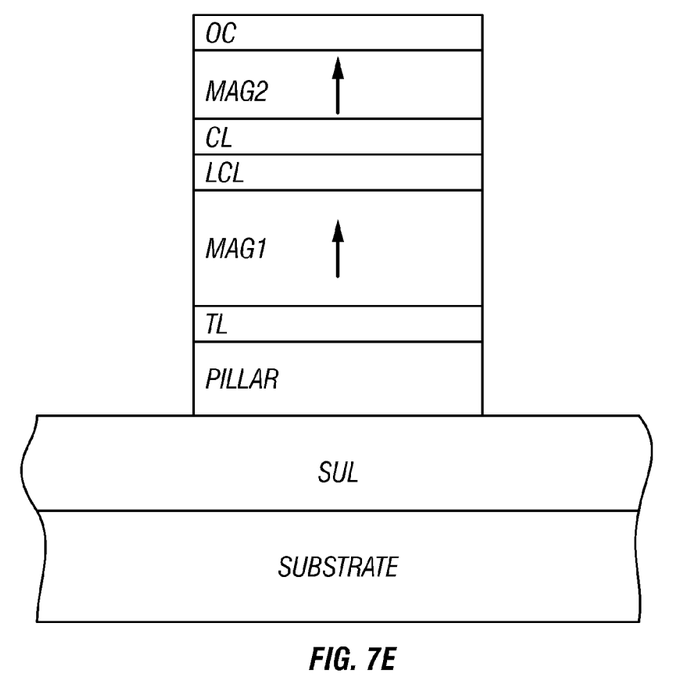

FIG. 7C is an implementation wherein the exchange-spring RL structure comprises MAG2 ferromagnetically coupled to MAG1 across a CL. FIG. 7D is an implementation wherein the exchange-spring RL structure comprises MAG2 ferromagnetically coupled to MAG1 across a CL with a LCL above and in contact with the upper magnetic layer MAG2 for mediating intergranular exchange coupling in MAG2. In an alternative implementation of FIG. 7D, the LCL may be located below and in contact with MAG2, i.e. between the CL and MAG2. FIG. 7E is an implementation wherein the exchange-spring RL structure comprises MAG2 ferromagnetically coupled to MAG1 across a CL with a LCL above and in contact with the lower magnetic layer MAG1 for mediating intergranular exchange coupling in MAG1. In an alternative implementation of FIG. 7E, the LCL may be located below and in contact with MAG1, i.e. between the template layer (TL) and MAG1. In the implementations shown in FIGS. 7C, 7D and 7E, MAG2 and MAG1 may have similar or substantially different values of $H_k$.

A representative disk structure for the invention shown in FIGS. 7B-7E will now be described. The hard disk substrate may be any commercially available glass substrate, but may also be a conventional aluminum alloy with a NiP surface coating, or an alternative substrate, such as silicon, canasite or silicon-carbide. The substrate may also be a pre-etched substrate as described above.

If the perpendicular magnetic recording disk is the type with a SUL then the SUL may be formed of magnetically permeable materials such as alloys of CoNiFe, FeCoB, CoCuFe, NiFe, FeAlSi, FeTaN, FeN, FeTaC, CoTaZr, CoFeTaZr, CoFeB, and CoZrNb. The SUL is a continuous non-patterned layer formed on the disk base or substrate. The SUL may also be a laminated or multilayered SUL formed of multiple soft magnetic films separated by nonmagnetic films, such as electrically conductive films of Al or CoCr. The SUL may also be a laminated or multilayered SUL formed of multiple soft magnetic films separated by interlayer films that mediate an antiferromagnetic coupling, such as Ru, Ir, or Cr or alloys thereof. An optional adhesion layer (OL) (not shown) for the growth of the SUL, such as an AlTi alloy or a similar material with a thickness of about 2-8 nm, may be located on the substrate before the formation of the SUL.

If the disk includes a SUL, then an exchange-break layer (EBL) may be located on top of the SUL. It acts to break the magnetic exchange coupling between the magnetically permeable films of the SUL and the RL and also serves to facilitate epitaxial growth of the RL. The EBL may not be necessary, but if used it can be a nonmagnetic titanium (Ti) layer; a non-electrically-conducting material such as Si, Ge and SiGe alloys; a metal such as Cr, Ru, W, Zr, Nb, Mo, V and Al; a metal alloy such as amorphous CrTi and NiP; an amorphous carbon such as CNx, CHx and C; or oxides, nitrides or carbides of an element selected from the group consisting of Si, Al, Zr, Ti, and B. If an EBL is used, a seed layer may be used on top of the SUL before deposition of the EBL. For example, if Ru is used as the EBL, a 1-8 nm thick NiFe, NiW or NiWCr seed layer may be deposited on top of the SUL, followed by a 3-30 nm thick Ru EBL. The EBL may also be a multilayered EBL.

The MAG1 and MAG2 layers may be formed of any of the known amorphous or crystalline materials and structures that exhibit perpendicular magnetic anisotropy. Thus, the MAG1 and MAG2 may each be a layer of granular polycrystalline cobalt alloy, such as a CoPt or CoPtCr alloy, with or without a suitable segregant such as oxides of Si, Ta, Ti, Nb, Cr, V and B. Also, MAG1 and MAG2 may each be composed of multilayers with perpendicular magnetic anisotropy, such as Co/Pt, Co/Pd, Fe/Pt, Fe/Pd and Co/Ni multilayers, with or without a suitable segregant such as the materials mentioned above. In addition, perpendicular magnetic layers containing rare earth elements are useable for MAG1 and MAG2, such as CoSm, TbFe, TbFeCo, GdFe alloys. MAG1 and MAG2 may have substantially different magnetic properties, such as different anisotropy fields ($H_k$), to assure that they respond differently to the applied write field and thereby exhibit the exchange-spring behavior to improve writability. MAG1 and MAG2 may also have substantially the same anisotropy field $H_k$, meaning that the $H_k$ value for the layer with the lower $H_k$ is at least 70% (and up to at least 90%) of the $H_k$ value for the layer with the higher $H_k$, and still exhibit the exchange-spring behavior as described above an illustrated in FIG. 6 due to the depth dependence of the write field.

If MAG1 is a granular cobalt alloy then the template layer (TL) for the growth of MAG1 may be any of the materials described above for use as the EBL. If MAG1 is formed of multilayers with perpendicular magnetic anisotropy, such as Co/Pt, Co/Pd, Fe/Pt, Fe/Pd and Co/Ni multilayers, then the TL may comprise a Ta layer with a layer of Pt or Pd on the Ta layer.

The CL may be a hexagonal-close-packed (hcp) material, which can mediate a weak ferromagnetic coupling and also provide a good template for the growth of MAG2. Because the CL must enable an appropriate interlayer exchange coupling strength, it should be either nonmagnetic or weakly ferromagnetic. Thus the CL may be formed of RuCo and RuCoCr alloys with low Co content (<about 65 atomic percent), or CoCr and CoCrB alloys with high Cr and/or B content (Cr+B>about 30 atomic percent). Si-oxide or other oxides like oxides of Ta, Ti, Nb, Cr, V and B may be added to these alloys. The CL may also be formed of face-centered-cubic (fcc) materials, such as Pt or Pd or alloys based on Pt or Pd, because these materials enable a ferromagnetic coupling between magnetic layers of tunable strength (i.e., they reduce the coupling by increasing the thickness) and are compatible with media growth.

Depending on the choice of material for CL, and more particularly on the concentration of cobalt (Co) in the CL, the CL may have a thickness of less than 3.0 nm, and more preferably between about 0.2 nm and 2.5 nm. Because Co is highly magnetic, a higher concentration of Co in the CL may be offset by thickening the CL to achieve an optimal interlayer exchange coupling between MAG1 and MAG2. The interlayer exchange coupling between MAG1 and MAG2 may be optimized, in part, by adjusting the materials and thickness of the CL. The CL should provide a coupling strength sufficient to have a considerable effect on the switching field (and the SFD), but small enough to not couple the MAG1 and MAG2 layers rigidly together.

The LCL may be formed of Co, or ferromagnetic Co alloys, such as CoCr alloys. The Co alloys may include one or both of Pt and B. The LCL is deposited directly on MAG2 in the FIG. 7D implementation, or the LCL is deposited on the CL and MAG2 is deposited directly on the LCL in the alternative FIG. 7D implementation. The LCL is deposited directly on MAG1 in the FIG. 7E implementation, or the LCL is deposited on the TL and MAG1 is deposited directly on the LCL in the alternative FIG. 7E implementation. The LCL can be produced by various processing techniques, including sputtering without an oxygen partial pressure. The ferromagnetic alloy in the LCL has significantly greater intergranular exchange coupling than the ferromagnetic alloy with which it is in contact (MAG2 or MAG1). The LCL alloy should preferably not include any oxides or other segregants, which would tend to reduce intergranular exchange coupling in the LCL. Because the LCL grain boundaries overlay the boundaries of the generally segregated and decoupled grains of the MAG2 (or MAG1) layer with which it is in contact, and the LCL and MAG2 (or MAG1) grains are strongly coupled perpendicularly, the LCL introduces an effective intergranular exchange coupling in the MAG2 (or MAG1), or more precisely it enables a combined LCL+MAG2 (or LCL+MAG1) system with a tunable level of intergranular exchange. The total LCL+MAG2 thickness may be in the range of approximately 2-10 nm, preferably in the range of approximately 3-7 nm. The total LCL+MAG1 thickness may be in the range of approximately 3-20 nm, preferably in the range of approximately 5-15 nm. The LCL portion of the total LCL+MAG2 (or LCL+MAG1) thickness should be between about 10-90%, with a preferred range of about 20-60%. The optimal LCL thickness can be determined experimentally by varying the thickness and measuring the performance of the disks to determine which thickness provides the most suitable level of intergranular exchange coupling for the combined LCL+MAG2 (or LCL+MAG1) system.

The OC formed on top of the RL may be an amorphous "diamond-like" carbon film or other known protective overcoats, such as Si-nitride, BN or B4C.

Figure 8:
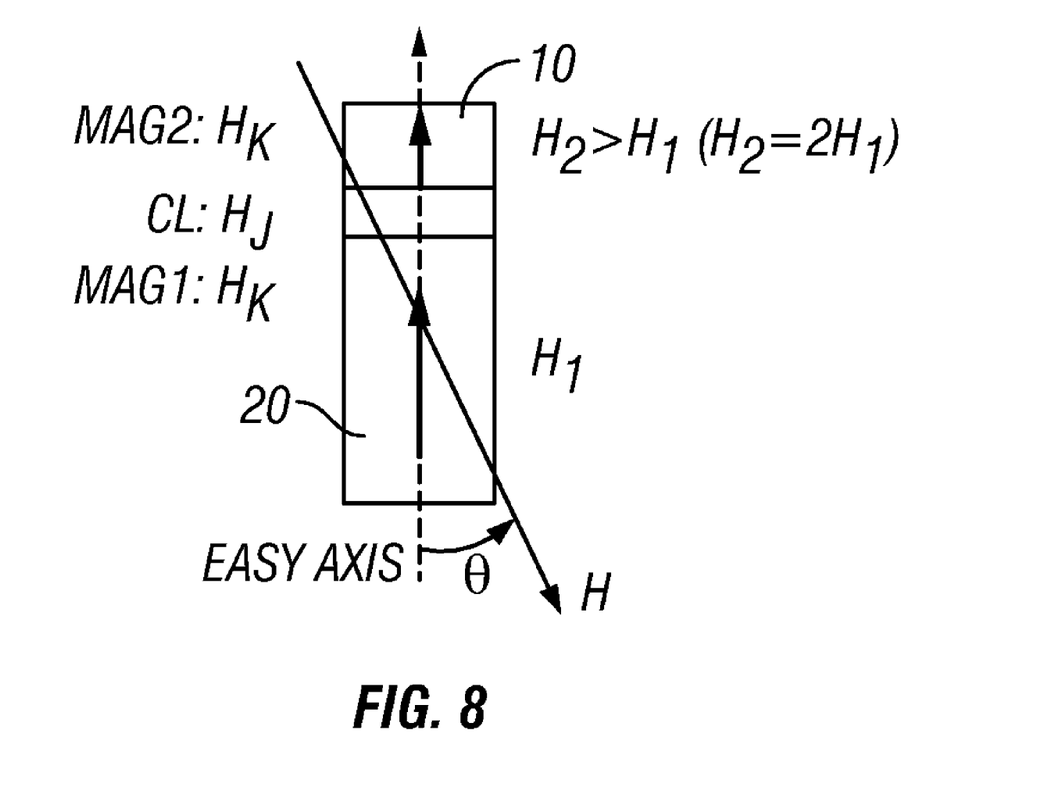
FIG. 8 is a schematic of a magnetic model of the magnetic grains of MAG1 and MAG2 with their easy axes of magnetization acted upon by the fields H1 and H2, respectively, from the write head.

The advantage of the medium of this invention has been estimated by magnetic modeling calculations for a single magnetic island for the implementation of FIG. 7C. In the model, schematically displayed in FIG. 8, the MAG2 and MAG1 grains 10, 20 are modeled as two coupled Stoner-Wohlfarth particles, each having uniaxial substantially perpendicular magnetic anisotropy. MAG1 and MAG2 have the same anisotropy field $H_k$ and are coupled by the coupling layer (CL) that mediates a ferromagnetic coupling of strength $H_J$. In this model it is assumed that the write head-generated field H is applied at an angle θ, which is identical for both MAG1 and MAG2 layers, but is stronger in the upper layer MAG2 than in MAG1, i.e. H2>H1. For the numerical simulations it was assumed that H2=2H1, but any field relation H2>H1 will show fundamentally the same effects.

Figure 9A:
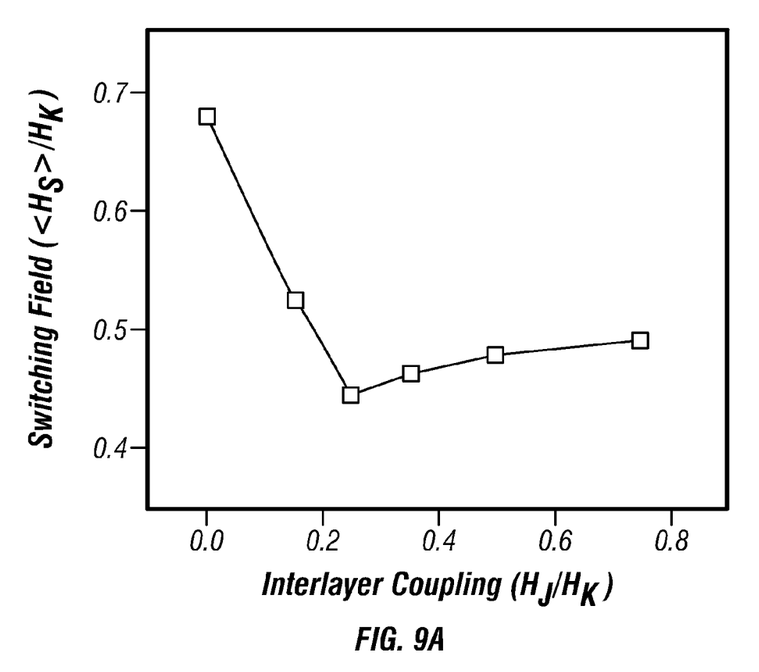
FIG. 9A is a graph of averaged switching field $<H_S>$ as a function of the interlayer coupling strength $H_J$ calculated for a field angle $\theta=10$ degrees from the model of FIG. 8.
Figure 9B:
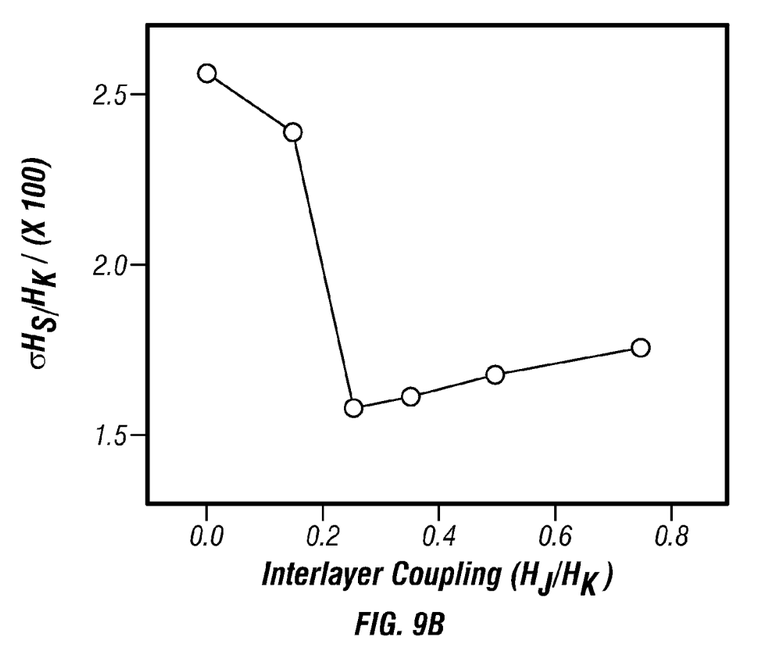
FIG. 9B is a graph of switching field distribution (SFD) width $\sigma H_S$ in units of $H_k$ as a function of the interlayer coupling strength $H_J$ and calculated for a field angle $\theta=10$ degrees from the model of FIG. 8.

FIGS. 9A-9B and FIGS. 10A-10B show the results of the modeling. FIG. 9A is a graph of averaged switching field $<H_S>$ as a function of the interlayer coupling strength $H_J$ calculated for a field angle θ=10 degrees and shows $<H_S>$ substantially reduced for an optimum value of $H_J/H_k$. FIG. 9B is a graph of switching field distribution (SFD) width $\sigma H_S$ in units of $H_k$, also as a function of the interlayer coupling strength $H_J$ and calculated for a field angle θ=10 degrees, and shows a reduced SFD width for an optimum value of $H_J/H_k$.

Figure 10A:
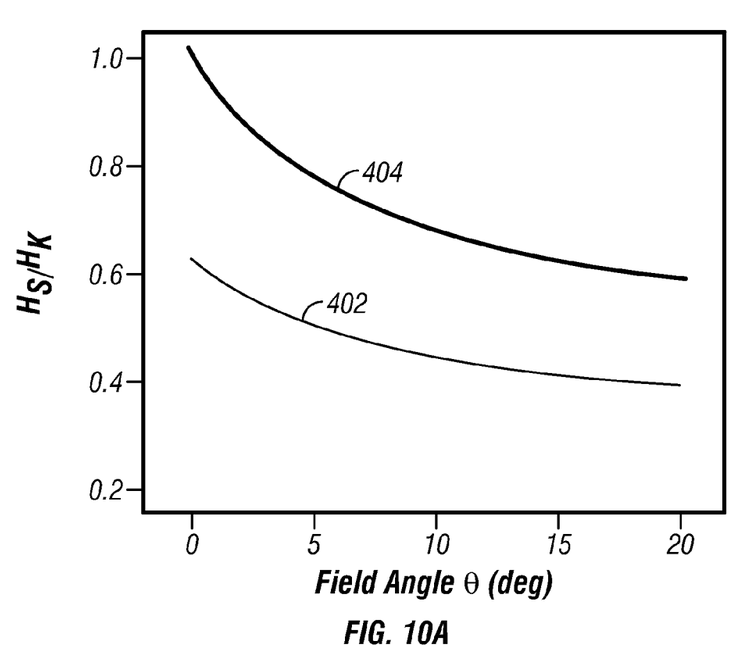
FIG. 10A is a graph of switching field $H_S$ as a function of field angle for a single layer RL structure in comparison to the exchange-spring RL structure from the model of FIG. 8.
Figure 10B:
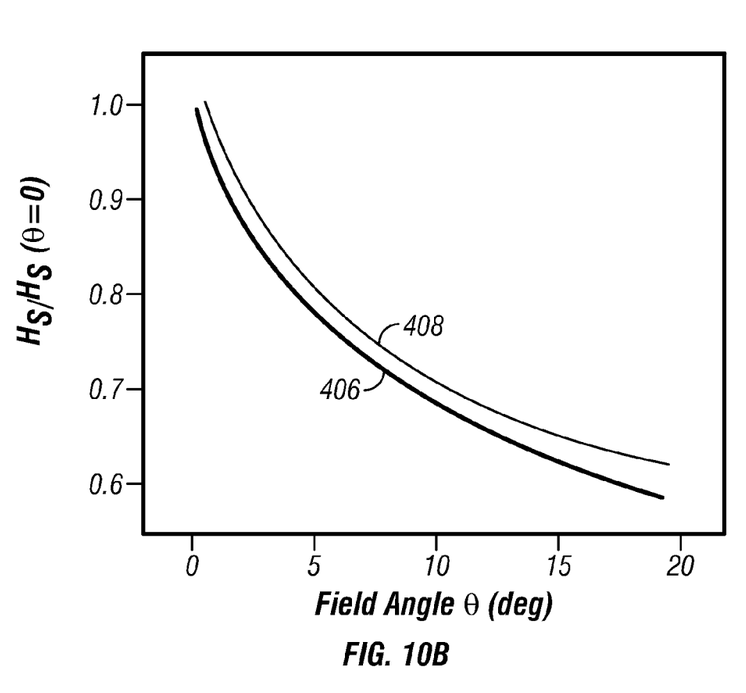
FIG. 10B is a graph of switching field $H_S$ normalized to the fully aligned case (field angle of zero) as a function of field angle for a single layer RL structure in comparison to the exchange-spring RL structure from the model of FIG. 8.

FIGS. 10A-10B show the field angle dependence of the switching field $H_S$ for a single layer RL structure in comparison to the exchange-spring RL structure according to the implementation in FIG. 7C. FIG. 10A shows the improved writability (lower required switching field $H_S$ for all field angles) for the exchange-spring RL structure (curve 402) over the single layer RL (curve 404). FIG. 10B demonstrates that upon normalizing to the fully aligned case (θ=0), the necessary switching field $H_S$ falls off substantially less for the exchange-spring RL structure (curve 406) than for the single layer RL (curve 408), which means that the head fringing fields are less able to switch the magnetization of magnetic islands on adjacent tracks. This advantage of the exchange-spring RL structure, in conjunction with the overall reduced SFD width (FIG. 10B), improves the track definition and suppresses adjacent track overwrite, as well as gives a better defined down-track write window for a more robust recording performance.

The improvement in SFD was confirmed experimentally for an exchange-spring RL structure like that shown in FIG. 7B. In this example MAG1 was a high-$H_k$ Co/Pd multilayer of 4 Co(2.5 Å)/Pd(14 Å) bilayers, and MAG2 was a lower-$H_k$ Co/Ni multilayer of 2 Co(2 Å)/Ni(6 Å) bilayers. This structure showed a SFD width approximately half that for a conventional single RL structure made of 8 Co(4.5 Å)/Pd(9 Å) bilayers. As explained above this improvement in SFD is likely due to the fact that the anisotropy of Co/Pd and Co/Ni are dominated by different mechanisms so that the local variations in the anisotropy within the two different laminates are independent and thus decorrelated.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A patterned perpendicular magnetic recording disk having discrete individually magnetizable data islands comprising:
   a substrate having a generally planar surface and a plurality of spaced-apart pillars extending generally perpendicularly from said surface;
   a recording layer structure on the top of each pillar, the recording layer structure comprising a first multilayer having an out-of-plane easy axis of magnetization and selected from the group consisting of Co/Pt, Co/Pd, Fe/Pt, Fe/Pd and Co/Ni multilayers and a second multilayer having an out-of-plane easy axis of magnetization and selected from said group but different from the selected first multilayer, the second multilayer being ferromagnetically exchange-coupled to the first multilayer; and
   nonmagnetic regions on the substrate between the pillars, said nonmagnetic regions having no recording layer structure, whereby the spaced-apart pillars with recording layer structure are discrete individually magnetizable data islands;
   wherein said first and second multilayers have different anisotropy fields;
   wherein said first multilayer exhibits a first switching field distribution (SFD) on spaced-apart pillars and said second multilayer exhibits a second SFD on spaced-apart pillars; and
   wherein said recording layer structure of said exchange-coupled first and second multilayers exhibits a SFD less than the greater of said first and second SFDs.

2. The disk of claim 1 wherein the substrate comprises Si; and wherein the substrate further comprises substantially nonmagnetic regions at said substrate surface between said pillars, said nonmagnetic regions comprising a compound of Si and at least one element of said first multilayer.

3. The disk of claim 1 wherein the anisotropy field of the multilayer with the lower anisotropy field is equal to or greater than 70% and less than 100% of the anisotropy field of the multilayer with the higher anisotropy field.

4. The disk of claim 1 further comprising a coupling layer (CL) between the first multilayer and the second multilayer and permitting ferromagnetic coupling of the first multilayer with the second multilayer.

5. The disk of claim 4 wherein the CL is formed of a material selected from the group consisting of (a) a RuCo alloy with Co less than about 65 atomic percent, (b) a RuCoCr alloy with Co less than about 65 atomic percent, (c) an alloy of Co and one or more of Cr and B with the combined content of Cr and B greater than about 30 atomic percent, and (d) a material selected from the group consisting of Pt, Pd, Pt-based alloys, and Pd-based alloys.

6. The disk of claim 1 wherein the islands are arranged on the substrate in a plurality of generally concentric circular tracks.

7. A perpendicular magnetic recording disk drive comprising:
   the disk of claim 1;
   a write head for magnetizing the recording layer structure on the tops of the pillars in a direction generally perpendicular to the substrate surface from which the pillars extend; and
   a read head for detecting the magnetized recording layer structure on the pillar tops.

8. The disk of claim 1 wherein one of said first and second multilayers is a Co/Pd multilayer the other of said first and second multilayers is a Co/Ni multilayer.

9. A patterned perpendicular magnetic recording disk having discrete individually magnetizable data islands comprising:
   a substrate having a generally planar surface and a plurality of spaced-apart pillars extending generally perpendicularly from said surface;
   an exchange-spring recording layer structure on the top of each pillar, the recording layer structure comprising a Co/Pd multilayer and a Co/Ni multilayer on and ferromagnetically exchange-coupled to the Co/Pd multilayer, the Co/Ni multilayer having an anisotropy field less than the anisotropy field of the Co/Pd multilayer; and
   nonmagnetic regions on the substrate between the pillars, said nonmagnetic regions having no recording layer structure, whereby the spaced-apart pillars with recording layer structure are discrete individually magnetizable data islands.

* * * * *